(12) United States Patent
Williams et al.

(10) Patent No.: US 9,269,171 B2
(45) Date of Patent: Feb. 23, 2016

(54) METHOD AND SYSTEM FOR PLOTTING DATA

(71) Applicant: General Electric Company, Schenectady, NY (US)

(72) Inventors: Scott Terrell Williams, Minden, NV (US); Bryan Alexander Holzbauer, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 13/715,585

(22) Filed: Dec. 14, 2012

(65) Prior Publication Data

US 2014/0168247 A1 Jun. 19, 2014

(51) Int. Cl.
*G06T 11/20* (2006.01)
*G09G 5/02* (2006.01)

(52) U.S. Cl.
CPC ............... *G06T 11/206* (2013.01); *G09G 5/02* (2013.01)

(58) Field of Classification Search
CPC .. G09G 5/06; G06T 11/206; G06F 17/30713; G06F 17/30716; G06F 19/26; G06F 11/32; G06F 11/323; G01R 13/02; G01R 13/0272; G01R 13/345
See application file for complete search history.

(56) References Cited

U.S. PATENT DOCUMENTS

| | | | |
|---|---|---|---|
| 5,029,110 A | 7/1991 | Purchase et al. | |
| 6,362,006 B1 | 3/2002 | Potyrailo et al. | |
| 6,477,485 B1 | 11/2002 | Radulovic et al. | |
| 6,753,944 B1 | 6/2004 | Dajnowicz | |
| 7,010,461 B2 | 3/2006 | Draxton et al. | |
| 7,109,991 B2 * | 9/2006 | Turpin et al. | 345/440 |
| 7,277,777 B2 | 10/2007 | Draxton et al. | |
| 7,756,657 B2 | 7/2010 | Davidson et al. | |
| 8,089,390 B2 | 1/2012 | Jones et al. | |
| 8,170,800 B2 | 5/2012 | Aamodt et al. | |
| 2003/0058243 A1 | 3/2003 | Faust et al. | |
| 2005/0149264 A1 | 7/2005 | Tarvin et al. | |
| 2007/0219758 A1 | 9/2007 | Bloomfield | |

(Continued)

FOREIGN PATENT DOCUMENTS

EP 2444937 A2 4/2012

OTHER PUBLICATIONS

"Contour and Surface Charts in Excel 2007—Peltier Tech Blog" Peltier, Jon. Feb. 23, 2010. Peltier Technical Services, Inc. © 2014. Accessed via web http://peltiertech.com/contour-and-surface-charts-in-excel-2007/ on Mar. 11, 2015.*

(Continued)

*Primary Examiner* — Antonio A Caschera
(74) *Attorney, Agent, or Firm* — Fletcher Yoder, P.C.

(57) ABSTRACT

In one aspect, a method for displaying data from at least one sensor of a machine may include storing, in a memory coupled to a computing device, a data set based on measurement information from the sensor, separating the data set into a plurality of data samples based on at least one characteristic of the measurement information, and selecting a first visual format and a second visual format from a range of visual formats. The first visual format are different from the second visual format. The method may then include displaying, with a display device, a first visual representation of a first data sample of the plurality of data samples using the first visual format via a plot and displaying a second visual representation of a second data sample of the plurality of data samples using the second visual format via the same plot.

18 Claims, 6 Drawing Sheets

(56) References Cited

U.S. PATENT DOCUMENTS

2008/0079723 A1 4/2008 Hanson et al.
2009/0173494 A1 7/2009 Tarvin et al.
2010/0278086 A1 11/2010 Pochiraju et al.

OTHER PUBLICATIONS

"Present your data in a surface chart" Aug. 29, 2007. Microsoft Office. Accessed via web https://support.office.com/en-au/article/Present-your-data-in--a-surface-chart-1050ffc6-6143-4ee7-82b3-421bea88a1e8?ui=en-US&rs=en-AU&ad=AU on Mar. 11, 2015.*

"A flexible charting library for .NET—Code Project." JChampion. Jun. 6, 2007. Accessed via the Web: http://www.codeproject.com/Articles/5431/A-flexible-charting-library-for-NET on Jul. 13, 2015.*

Schönbrodt, Felix. "Visually weighted regression in R (à la Solomon Hsiang)." Aug. 30, 2012. Accessed via the Web @ http://www.nicebread.de/visually-weighted-regression-in-r-a-la-solomon-hsiang/ on Sep. 21, 2015.*

Swihart et al. "Lasagna plots: a saucy alternative to spaghetti plots." Epidemiology. Sep. 2010; vol. 21 (issue 5) : pp. 621-625.*

Heer et al., "A Tour Through the Visualization Zoo", Communications of the ACM, vol. No. 53, Issue No. 6, pp. 59-67, Jun. 1, 2010.

PCT Search Report issued in connection with corresponding Application No. PCT/US2013/070363 on Feb. 17, 2014.

* cited by examiner

METHOD AND SYSTEM FOR PLOTTING DATA

BACKGROUND OF THE INVENTION

The field of the invention relates generally to displaying information, and more particularly to a method and system for use in displaying three dimensions of data on a plot having two spatial dimensions.

In a facility in which resources are received, processed, and converted by machines into electricity or another product, it is often beneficial to monitor the status of the machines to determine whether they are operating normally. To facilitate such monitoring in at least some facilities, sensors are positioned adjacent to such machines to measure one or more parameters or characteristics, such as vibrations, temperatures, pressures, proximities, positions, voltages or currents associated with the machines. In some environments with multiple machines and multiple sensors, information collected by the sensors is transmitted to a central computer for evaluation by the computer and/or a user of the computer. Additionally, the information may be stored in a database and reviewed on an as-needed basis.

Data stored as described above may relate to a particular type of measurement for a particular machine over a specified time period. The data may be presented to a user in a waterfall plot, wherein a third spatial dimension (the Z-axis) represents time. Waterfall plots and other plots having three dimensions, must be projected onto a two dimensional plane for viewing on a screen or printout by a user. However, projecting data as such can obscure fluctuations and fine details in data sets represented in such plots. Accordingly, a user reviewing sensor measurements in such a plot may have difficulty perceiving fine details in the collected sensor measurements.

BRIEF DESCRIPTION OF THE INVENTION

In one aspect, a method for displaying data from at least one sensor of a machine is provided. The method is implemented by a computing device. The method includes storing, in a memory coupled to the computing device, a data set based on measurement information from the sensor. The method further includes separating the data set into a plurality of data samples based on at least one characteristic of the measurement information. The method further includes selecting a first visual format and a second visual format from a range of visual formats, wherein the first visual format is different from the second visual format. The method additionally includes displaying, with a display device, a first visual representation of a first data sample of the plurality of data samples using a first visual format. The first visual representation is displayed on a plot. The method additionally includes displaying, with the display device, a second visual representation of a second data sample of the plurality of data samples using a second visual format.

In another aspect, a computing device for displaying data from at least one sensor of a machine is provided. The computing device includes a processor, a display device coupled to the processor, and a memory coupled to the processor. The memory contains processor-executable instructions for performing the steps of storing, in the memory, a data set based on measurement information from the sensor and separating the data set into a plurality of data samples based on at least one characteristic of the measurement information. The memory further contains processor-executable instructions for selecting a first visual format and a second visual format from a range of visual formats, wherein the first visual format is different from the second visual format. The memory further contains processor-executable instructions for displaying, with the display device, a first visual representation of a first data sample of the plurality of data samples using a first visual format. The first visual representation is displayed on a plot. The memory further contains processor-executable instructions for displaying, with the display device, a second visual representation of a second data sample of the plurality of data samples using a second visual format. The second visual representation is displayed on the plot.

In another aspect, a system for displaying data from at least one sensor of a machine is provided. The system includes the at least one sensor, the machine, and a computing device. The computing device includes a processor, a display device coupled to the processor, and a memory coupled to the processor. The memory contains processor-executable instructions for performing the steps of storing, in the memory, a data set based on measurement information from the sensor and separating the data set into a plurality of data samples based on at least one characteristic of the measurement information. The memory further includes processor-executable instructions for selecting a first visual format and a second visual format from a range of visual formats, wherein the first visual format is different from the second visual format. The memory further contains processor-executable instructions for displaying, with the display device, a first visual representation of a first data sample of the plurality of data samples using a first visual format. The first visual representation is displayed on a plot. The memory further contains processor-executable instructions for displaying, with the display device, a second visual representation of a second data sample of the plurality of data samples using a second visual format. The second visual representation is displayed on the plot.

DETAILED DESCRIPTION OF THE INVENTION

Figure 1:
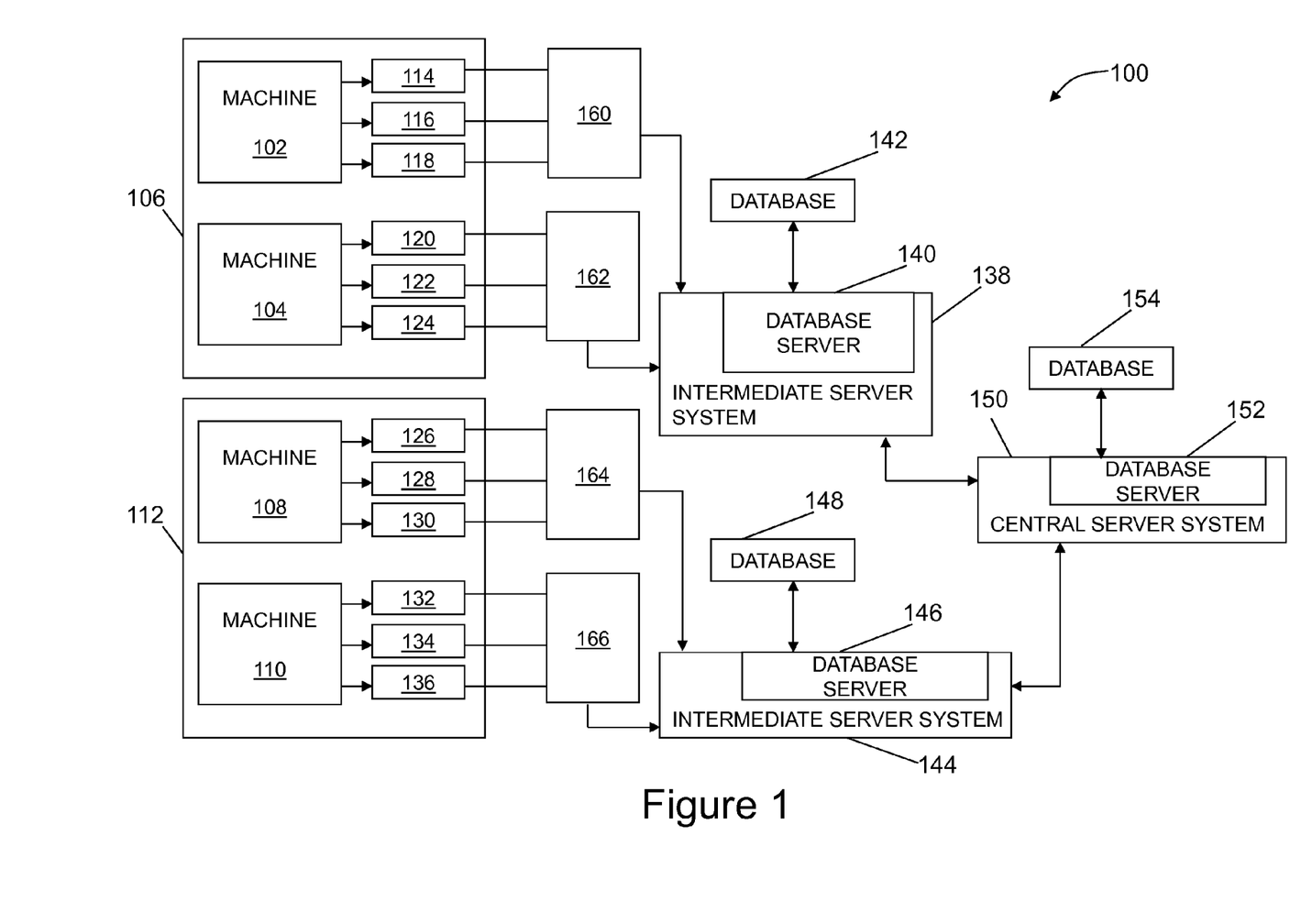
FIG. 1 is a block diagram of an exemplary system that may be used to collect information from multiple sensors from multiple machines.

FIG. 1 is a block diagram of an exemplary system 100 for use in collecting information from multiple sensors 114, 116, 118, 120, 122, 124, 126, 128, 130, 132, 134, and 136 from multiple machines 102, 104, 108, and 110. In the exemplary embodiment, machines 102 and 104 are located in a facility 106. Likewise, machines 108 and 110 are located in a facility 112. Facilities 106 and 112 may be involved, for example, in the generation of electricity. For example, facilities 106 and 112, and more specifically, machines 102, 104, 108, and 110, may be used in converting a raw resource into electricity. In other embodiments, facilities 106 and 112 may be used in any other process involving multiple machines. In other embodiments, facilities 106 and 112 may be involved in different processes. In yet other embodiments, there may be any number of facilities and/or machines.

Sensors 114, 116, and 118 are coupled to machine 102. In the exemplary embodiment, sensor 114 measures a temperature of machine 102, sensor 116 measures a vibration of machine 102, and sensor 118 measures a voltage of machine 102. Likewise, sensors 120, 122, and 124 are also communicatively coupled to machine 104. In the exemplary embodiment, sensor 120 measures a temperature of machine 104, sensor 122 measures a vibration of machine 104, and sensor 124 measures a voltage of machine 104. Sensors 126, 128, and 130 are communicatively coupled to machine 108. Specifically, in the exemplary embodiment, sensor 126 measures a temperature of machine 108, sensor 128 measures a vibration of machine 108, and sensor 130 measures a voltage of machine 108. Additionally, sensors 132, 134, and 136 are also coupled to machine 110 to enable sensor 132 to measure a temperature of machine 110, sensor 134 to measure a vibration of machine 110, and sensor 136 to measure a voltage of machine 110.

A first monitoring system 160 is communicatively coupled to sensors 114, 116, 118 and receives measurement data therefrom. Likewise, a second monitoring system 162 is communicatively coupled to sensors 120, 122, 124 and receives measurement data therefrom. A third monitoring system 164 is communicatively coupled to sensors 126, 128, and 130 and receives measurement data therefrom. Further, a fourth monitoring system 166 is communicatively coupled to sensors 132, 134, and 136 and receives measurement data therefrom.

An intermediate server system 138 is communicatively coupled to monitoring systems 160 and 162. Intermediate server system 138 includes a database server 140 that stores and retrieves information in a database 142. Intermediate server system 138 receives measurement data from monitoring systems 160 and 162 and causes database server 140 to store the received measurement data in database 142. Similarly, an intermediate server system 144 is communicatively coupled to monitoring systems 164 and 166. Intermediate server system 144 includes a database server 146 that stores and retrieves information in database 148. Intermediate server system 144 receives measurement data from monitoring systems 164 and 166 and causes database server 146 to store the received measurement data in database 148.

A central server system 150 is coupled to intermediate server systems 138 and 144. Similar to intermediate server systems 138 and 144, central server system 150 includes a database server 152 that stores and retrieves information to and from a database 154. Central server system 150 transmits instructions to intermediate server systems 138 and 144 to provide measurement data stored in databases 142 and 148, respectively, for storage in database 154. In the exemplary embodiment, central server system 150 transmits instructions and receives the corresponding measurement data at regular intervals, for example, daily. In the exemplary embodiment, for efficiency, the transmissions from central server system 150 ensure that only measurement information that has been added or updated since the previous time the intermediate server systems 138 and 144 provided measurement information to central server system 150 are transmitted to central server system 150. After receiving the measurement information from intermediate server systems 138 and 144, central server system 150 causes database server 152 to store the received measurement information in database 154. Other embodiments may include a different number of sensors and/or sensors that may measure different characteristics or behaviors of one or more machines. Additionally, in alternative embodiments, there are no intermediate server systems and all sensors are coupled to a central server system. In yet other embodiments, all sensors are coupled to a single computing device.

Figure 2:
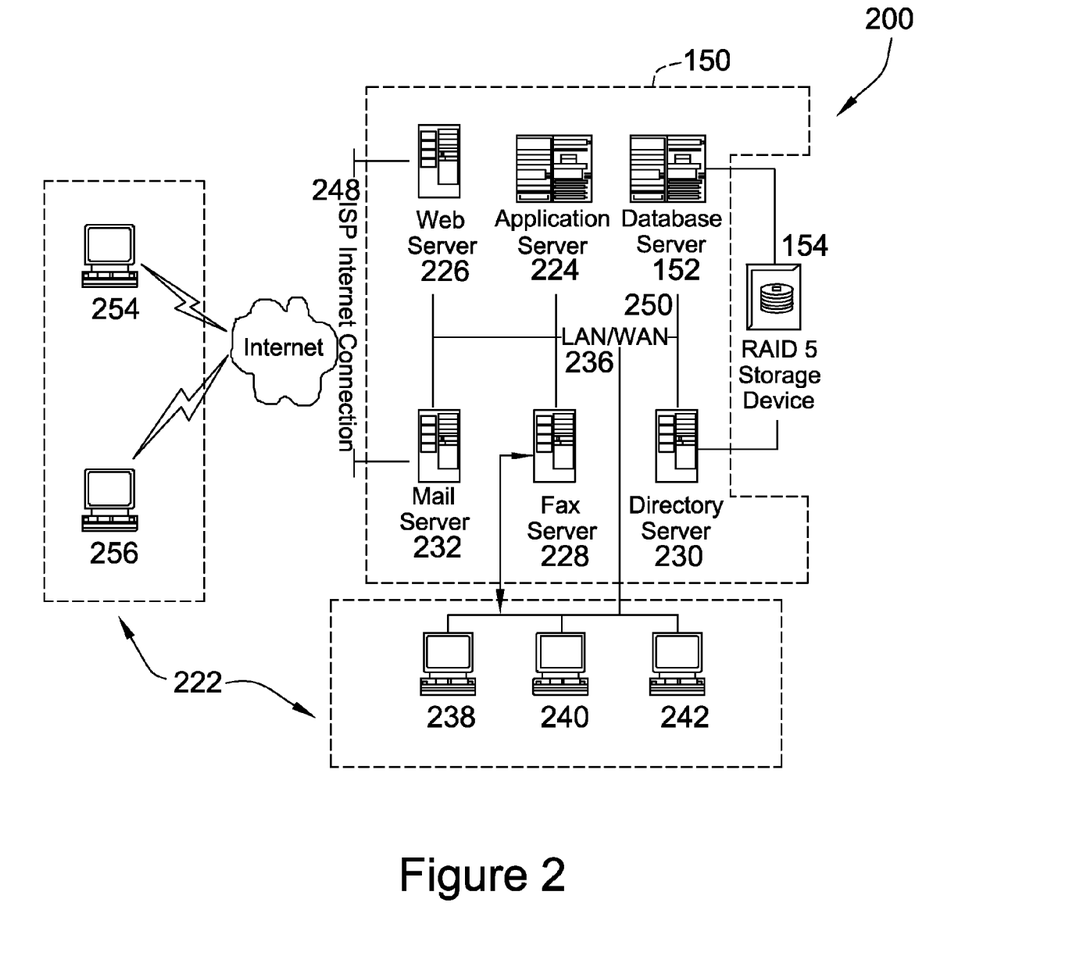
FIG. 2 is a block diagram of an exemplary system that may be used for displaying measurement information from at least one sensor in a machine.

FIG. 2 is a block diagram of an exemplary system 200 for use in displaying measurement information from at least one sensor, such as sensor 114, in a machine, such as machine 102, in accordance with an embodiment of the present invention. Components in system 200, identical to components of system 100 (shown in FIG. 1), are identified in FIG. 2 using the same reference numerals used in FIG. 1. System 200 includes central server system 150 and client systems 222. Central server system 150 also includes database server 152, an application server 224, a web server 226, a fax server 228, a directory server 230, and a mail server 232. A disk storage unit containing database 154 is coupled to database server 152 and to directory server 230. Servers 152, 224, 226, 228, 230, and 232 are communicatively coupled in a local area network (LAN) 236. In addition, a system administrator's workstation 238, a user workstation 240, and a supervisor's workstation 242 are coupled to LAN 236. Alternatively, workstations 238, 240, and 242 are coupled to LAN 236 using an Internet link or are connected through an Intranet.

Each workstation, 238, 240, and 242, is a computing device that includes a web browser. Although the functions performed at the workstations are typically illustrated as being performed at respective workstations 238, 240, and 242, such functions can be performed at one of many computing devices coupled to LAN 236. Workstations 238, 240, and 242 are illustrated as being associated with separate functions only to facilitate an understanding of the different types of functions that can be performed by individuals having access to LAN 236.

Central server system 150 is configured to be communicatively coupled to entities outside LAN 236 as well, such as workstations 254 and 256 via an Internet connection 248. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 250, local area network 236 could be used in place of WAN 250.

In the exemplary embodiment, any authorized individual or entity having a workstation 238, 240, 242, 254, 256 may access system 200. At least one of the client systems includes a manager workstation 256 located at a remote location. Workstations 254 and 256 include a computing device having a web browser. Also, workstations 254 and 256 are configured to communicate with server system 150. Furthermore, fax server 228 is configured to communicate with remotely located client systems 222 using a telephone link.

Figure 3:
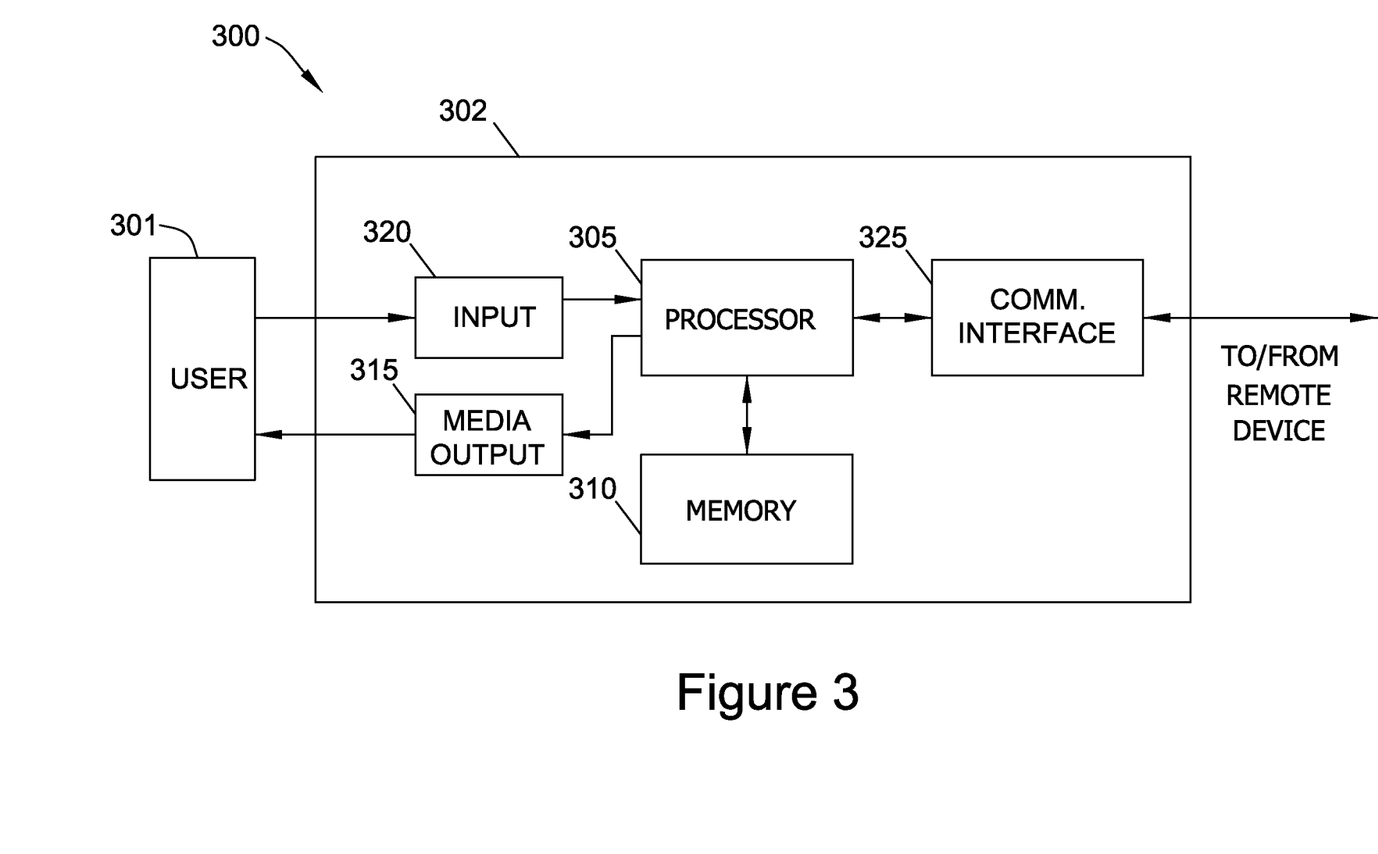
FIG. 3 illustrates an exemplary computing device that may be used with the system shown in FIG. 2.

FIG. 3 illustrates a block diagram 300 an exemplary computing device 302 that may be used with system 100 and/or system 200. For example, computing device 302 is representative of monitoring systems 160, 162, 164, and 166, intermediate server 138, intermediate server 144, any of servers 152, 224, 226, 228, 230, 232, of central server system 150, and/or client systems 240, 242, 254, and 256. Computing device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer readable media.

Computing device 302 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 315.

In some embodiments, computing device 302 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Computing device 302 may also include a communication interface 325, which is communicatively couplable to a remote computing device such as a server system 138, 144, 150 or a client system 222. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, processor-executable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from a server system, for example central server system 150. A client application allows a user, such as user 301, to display and interact with a server system, such as central server system 150, in a manner that does not necessarily involve a web page or website and which may offload more storage and/or processing functions to the client application from the server system.

Memory area 310 may include, but is not limited to, any computer-operated hardware suitable for storing and/or retrieving processor-executable instructions and/or data. Memory area 310 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 310 may include multiple storage units such as hard disks or solid state disks in a redundant array of inexpensive disks (RAID) configuration. Memory area 310 may include a storage area network (SAN) and/or a network attached storage (NAS) system. In some embodiments, memory area 310 includes memory that is integrated in computing device 302. For example, computing device 302 may include one or more hard disk drives as memory 310. Memory area 310 may also include memory that is external to computing device 302 and may be accessed by a plurality of computing devices 302. The above memory types are exemplary only, and are thus not limiting as to the types of memory usable for storage of a processor-executable instructions and/or data.

Figure 4:
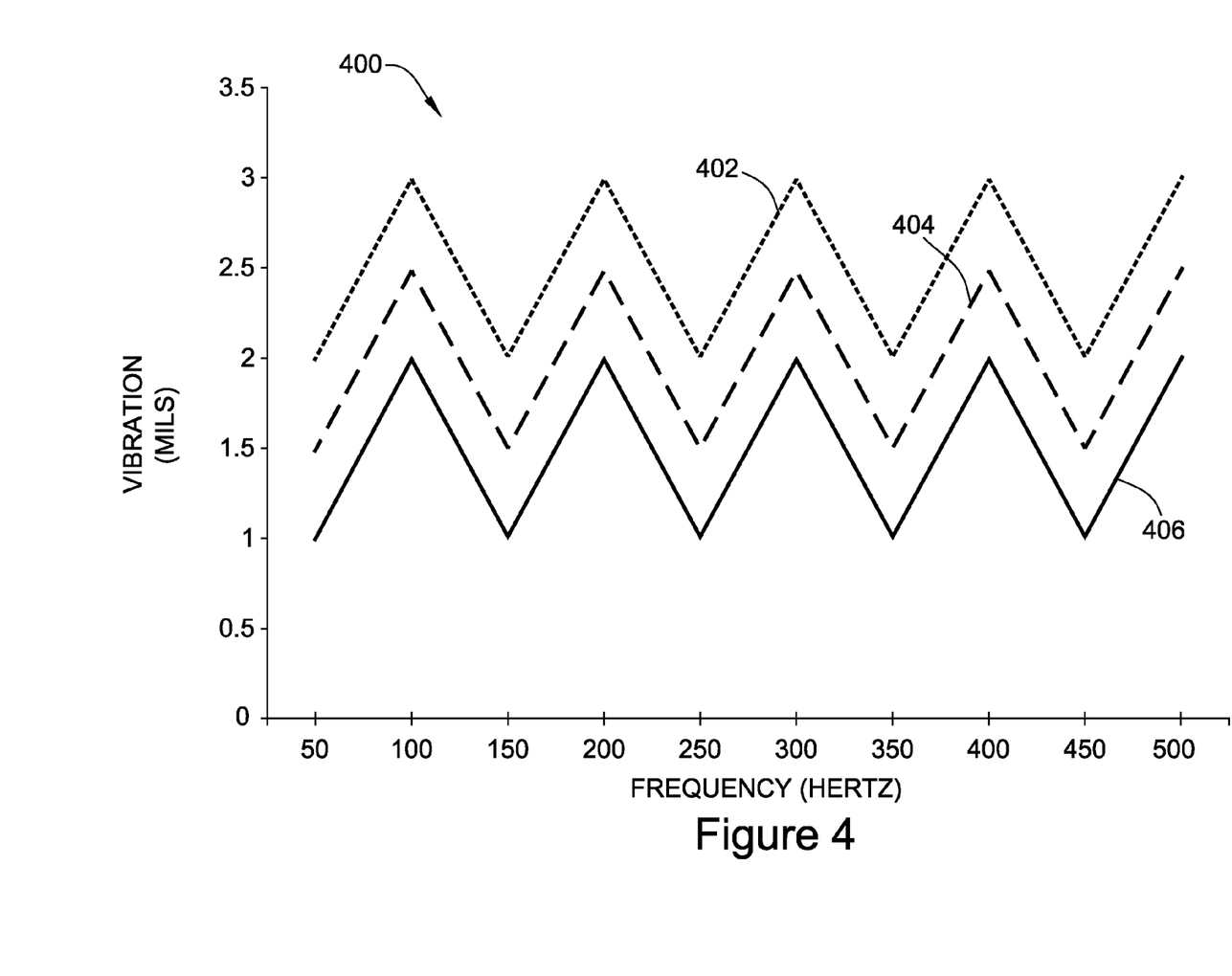
FIG. 4 is an exemplary plot that may be generated using the system shown in FIG. 2.

FIG. 4 is a plot 400 that may be generated using system 200 (shown in FIG. 2). Plot 400 may be displayed using a display device of media output component 315 (shown in FIG. 3). Plot 400 represents a data set of vibration information measured by sensor 116 (shown in FIG. 1) for machine 102 (shown in FIG. 1). That is, in plot 400, the amplitude of displacement in mils (milli-inches) is plotted against frequency, which is measured in Hertz. The measurement information is stored in memory area 310 (shown in FIG. 3) as a data set. As explained above, memory area 310 may include memory that is integrated into computing device 302 (shown in FIG. 3) and/or memory that is external, for example database 154 (also known as a "data store") (shown in FIGS. 1 and 2). Computing device 302 separates the data set into data samples based on a characteristic of the measurement information. In this example, the characteristic is time. More specifically, computing device 302 separates the data set into data samples that each contains 500 Hz of spectral resolution for a 100 millisecond data collection time period. Accordingly, plot 400 represents data samples collected over three minutes, where each data sample is collected one minute apart.

Visual representation 402 represents measurement information collected by sensor 116 during a first one hundred millisecond period of time. Visual representation 404 represents measurement information collected by sensor 116 during a second one hundred millisecond time period that starts one minute into the future. Additionally, visual representation 406 represents measurement information collected by sensor 116 during a third one hundred millisecond time period that starts another one minute in the future. In plot 400, each visual representation 402, 404, 406 is displayed in a different visual format. Visual representation 402 is displayed with dots, visual representation 404 is displayed with dashes, and visual representation 406 is displayed with a solid line. Accordingly, the visual formats fall in a range of patterns, which can be ordered generally by how solid or broken-up the resulting visual representation is. In other embodiments, the visual formats fall in a range of a different type, for example a range of darkness or lightness, a range of levels of transparency, a range of shades of grey, or a range of colors. In additional embodiments, the visual representations may blink at different frequencies in a range of frequencies and/or shake with varying degrees of amplitudes and/or frequencies in a range. In other embodiments, plot 400 may display measurement information of a different kind. For example, plot 400 might display information pertaining to a timebase waveform, with amplitude on a first axis, time on a second axis, and two or more waveform samples taken at different times from the same sensor shown with separate visual representations on the plot.

Figure 5:
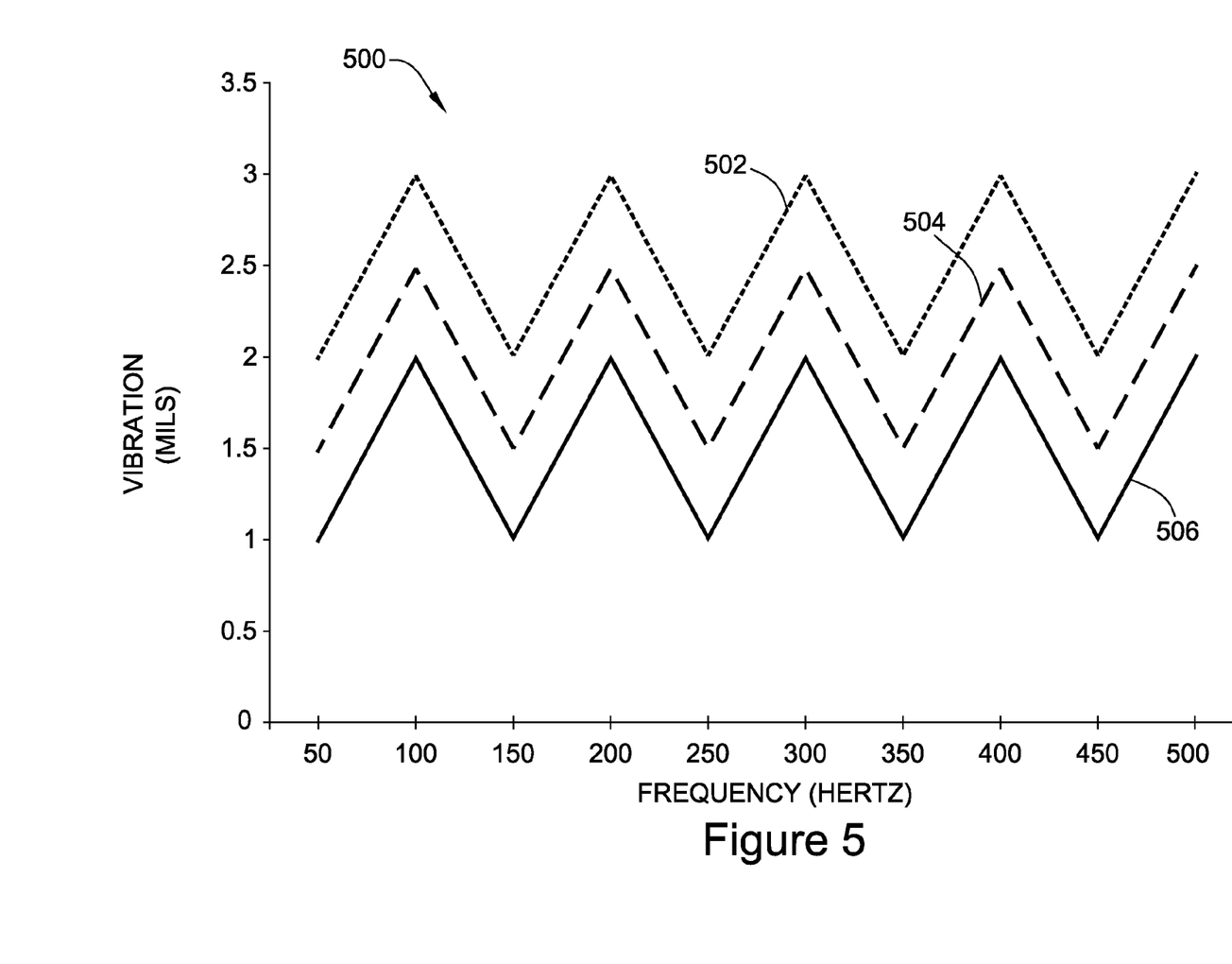
FIG. 5 is an exemplary plot that may be generated using the system shown in FIG. 2.

FIG. 5 is an exemplary plot 500 that may be generated using system 200 (shown in FIG. 2). Plot 500 may be displayed using a display device coupled to media output component 315 (shown in FIG. 3) of a computing device. Plot 500 represents a data set of vibration information measured by sensor 116 (shown in FIG. 1) of machine 102 (shown in FIG. 1). That is, plot 500 represents a data set based on measurements of vibration, in mils (milli-inches), versus frequency, which is measured in Hertz. The measurement information is stored in memory area 310 (shown in FIG. 3) as a data set. As explained above, memory area 310 may include memory that is integrated into computing device 302 and/or memory that is external, for example database 154 (shown FIGS. 1 and 2). Computing device 302 (shown in FIG. 3) separates the data set into data samples based on a characteristic of the measurement information. In other embodiments, the data samples are already stored separately in memory area 310 and the step of separating the data set is unnecessary.

In FIG. 5, the data set is separated into data samples by density. That is, a certain number of values, which are represented by visual representation 502, fall within a first range of data values. A greater number of values, which are represented by visual representation 504, information fall within a second range of data values. An even greater number of data values, which are represented by visual representation 506, fall within a third range of data values. In some embodiments, the measurement information contains values that do not fall exactly within the ranges represented in the visual representations. In such embodiments, maximum and minimum thresholds are used to group each of these values into one of the plurality of data samples and the corresponding visual representations. Visual representations 502, 504, and 506 each have a different visual format. The discussion of visual formats with reference to plot 400 (shown in FIG. 4) applies equally to visual formats of visual representations in plot 500.

Figure 6:
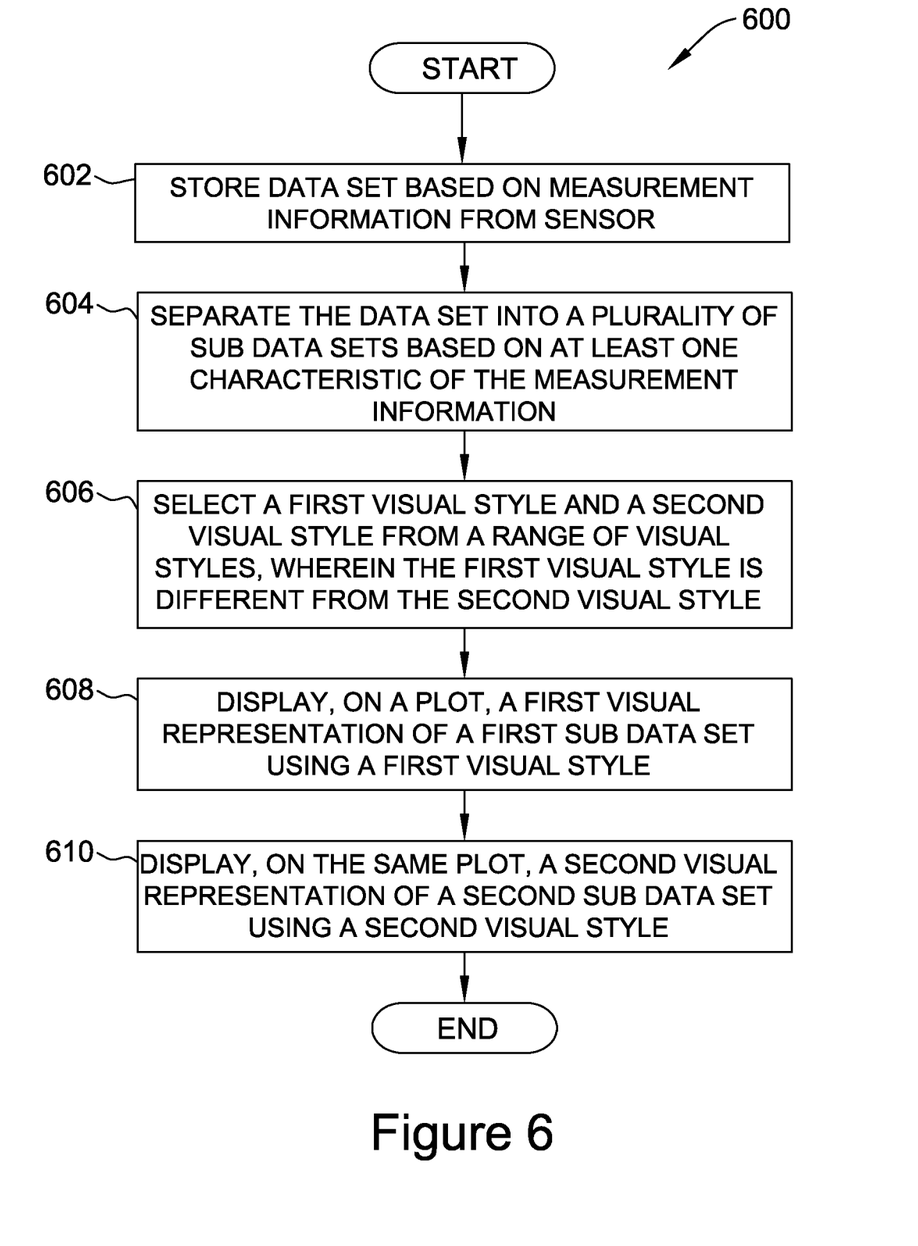
FIG. 6 is a flowchart of an exemplary method that may be implemented to display measurement information collected from at least one sensor of a machine.

FIG. 6 is a flowchart of an exemplary method 600 that may be implemented to display measurement information collected from at least one sensor of a machine. The method 600 may be implemented by one or more computing devices 302 of systems 100 and 200 (shown in FIGS. 1 and 2, respectively). Plot 400 of FIG. 4 is used as a non-limiting example in the following discussion. At step 602, at least one computing device 302 (shown in FIG. 3) of system 200 (shown in FIG. 2) stores, in memory area 310 (shown in FIG. 3), a data set based on measurement information from at least one sensor on a machine of a particular type. For example, the data set may be the vibration information from sensor 116, discussed with reference to FIG. 4. Again, sensor 116 (shown in FIG. 1) is associated with machine 102 (shown in FIG. 1). At step 604, at least one computing device 302 separates the stored data set into a plurality of data samples, based on at least one characteristic of the measurement information. In this example, the characteristic is time and the data set is separated into data samples, each corresponding to a different ten-second period of time. At step 606, at least one computing device 302 selects a first visual format and a second visual format from a range of visual formats. The first visual format and the second visual format are different from each other. At step 608, at least one computing device 302 displays a first visual representation of a first data sample, corresponding to the first one hundred millisecond period. Such a visual representation 402 appears in FIG. 4.

The first visual representation 402 is displayed on a plot, for example plot 400 of FIG. 4. The first visual representation 402 is displayed in a first visual format. As discussed with reference to FIG. 4, the first visual format is, for example, a pattern of dots. At step 610, at least one computing device 302 (shown in FIG. 3) displays a second visual representation of a second data sample. In this example, the second data sample corresponds with the second one hundred millisecond time period from one minute in the future. The second visual representation, for example visual representation 404 of FIG. 4, is displayed on the same plot 400 as the first visual representation 402. The second visual representation 404 is displayed in a different visual format than the first visual representation 402, for example a pattern of dashes, as shown in FIG. 4. The data set may be separated into more than two data samples and the plot may include more than two visual representations and corresponding visual formats. Indeed, as discussed above, FIG. 4 contains three visual representations 402, 404, and 406, each having a corresponding visual format. However, even more data samples with corresponding visual representations and visual formats may be displayed in other plots in accordance with embodiments of the present invention.

In one embodiment, the steps of method 600 are carried out exclusively by central server system 150 (shown in FIGS. 1 and 2) and the plot is displayed on a visual display local to central server system 150. In other embodiments, a computing device communicatively coupled to central server system 150, such as workstation 254 (shown in FIG. 2), requests and receives the data set, stores the data set in memory 310 (FIG. 3), separates the data set into data samples, and displays the plot as discussed above. In other embodiments, a portion of the steps of method 600 are carried out by central server system 150 and a second portion of the steps are carried out by a computing device communicatively coupled to central server system 150. In other embodiments, method 600 is carried out by a single computing device in accordance with FIG. 3, coupled to one or more sensors.

While the example embodiments discussed with reference to FIGS. 4-6 are described as generating two or three visual representations per plot, it should be understood that the above descriptions are simplified for ease of illustration and understanding. Accordingly, systems and methods in accordance with the present disclosure may generate many more visual representations (i.e., one for each data sample), for example tens, hundreds, or thousands, each with a different visual format.

A technical effect of systems and methods described herein includes at least one of: (a) storing, in a memory of a computing device, a data set based on measurement information from at least one sensor; (b) separating the data set into a plurality of data samples based on at least one characteristic of the measurement information; (c) selecting a first visual format and a second visual format from a range of visual formats, wherein the first visual format is different from the second visual format; (d) displaying, with a display device of the computing device, a first visual representation of a first data sample of the plurality of data samples using a first visual format, the first visual representation is displayed on a plot; and (e) displaying, with the display device, a second visual representation of a second data sample of the plurality of data samples using a second visual format, the second visual representation is displayed on the plot.

As compared to known methods and systems for use in displaying three dimensions of data on a plot having two spatial dimensions, the methods and systems described herein may be used to display three dimensions of data such on a plot having two spatial dimensions in a way that does not obscure fluctuations and fine details in data sets represented by the plots. Accordingly, users reviewing, for example, collected sensor measurements in plots generated using systems and methods described herein will be able to easily perceive fine details in the collected sensor measurements.

Exemplary embodiments of methods and systems for plotting data are described above in detail. The methods and systems described herein are not limited to the specific embodiments described herein, but rather, components of the systems and/or steps of the methods may be utilized independently and separately from other components and/or steps described herein. Additionally, while the embodiments described above generate two-dimensional plots, it is within the scope of the present disclosure that other embodiments generate plots with additional dimensions. For example, a third dimension may be a depth axis corresponding to a sensor location or another variable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for displaying data from at least one sensor of a machine, comprising:
   storing, in a memory coupled to a computing device, a data set based on measurement information from the at least one sensor;
   separating the data set into a plurality of data samples based on a time period;
   grouping the plurality of data samples into a first set of data samples and a second set of data samples based on a density of values of the plurality of data samples;
   displaying, with a display device, a first line representation of the first set of data samples, wherein the first line representation is determined based on a range of darkness and the density of values; and
   displaying, with the display device, a second line representation of the second set of data samples, wherein the first set of data samples comprise a greater density than the second set of data samples, wherein a first darkness level of the range of darkness associated with the first line representation and a second darkness level of the range of darkness associated with the second line representation vary directly with respect to a first number of data samples in the first set of data samples and a second number of data samples in the second set of data, and wherein the first line representation comprises a darker visualization in the range of darkness as compared to the second line representation.

2. The method of claim 1, wherein the first time period and the second time period are of equal length.

3. The method of claim 1, wherein displaying the first visual representation on a plot comprises displaying the first visual representation on a plot that has a maximum of two spatial dimensions.

4. The method of claim 1, comprising:
   displaying, with the display device, a third line representation of a third set of data samples of the plurality of data samples, the third line representation is displayed on a plot, wherein the third line representation is different from the first line representation and the second line representation.

5. The method of claim 1, wherein the first line representation and the second line representation comprises a plurality of types of lines.

6. The method of claim 5, wherein each of the plurality of types of lines comprises is broken to a degree based on a respective density of values associated with the first set of data samples or the second set of data samples.

7. The method of claim 1, wherein the first line representation and the second line representation comprises a plurality of colors.

8. A computing device for displaying data from at least one sensor of a machine, comprising:
   a processor;
   a display device coupled to the processor; and
   a memory coupled to the processor, wherein the memory contains processor-executable instructions for performing the steps of:
      storing, in the memory, a data set based on measurement information from the at least one sensor;
      separating the data set into a plurality of data samples based on a time period;
      grouping the plurality of data samples into a first set of data samples and a second set of data samples based on a density of values associated with the plurality of data samples;
      displaying, with the display device, a first line representation of the first set of data samples on a plot, the first line representation is determined based on a range of darkness and the density of values, wherein the plot has a maximum of two spatial dimensions; and
      displaying, with the display device, a second line representation of the second set of data samples on the plot, wherein the first set of data samples comprise a greater density than the second set of data samples, wherein a first darkness level of the range of darkness associated with the first line representation and a second darkness level of the range of darkness associated with the second line representation vary directly with respect to a first number of data samples in the first set of data samples and a second number of data samples in the second set of data, and wherein the first line representation comprises a darker visualization in the range of darkness as compared to the second line representation.

9. The computing device of claim 8, wherein the memory contains the processor-executable instructions for performing the step of separating the data set into a plurality of data samples based on time by:
   generating a first data sample based on a first time period; and
   generating a second data sample based on a second time period that occurred after the first time period, wherein the first time period and the second time period is separated by a third time period.

10. The computing device of claim 9, wherein the first time period and the second time period are of equal length.

11. The computing device of claim 8, wherein separating the data set into the plurality of data samples comprises:
   generating a first data sample based on a first density of data values; and
   generating a second data sample based on a second density of data values, wherein the first density is different from the second density.

12. The computing device of claim 8, wherein the memory contains processor-executable instructions for performing the step of:
   displaying, with the display device, a third line representation of a third set of data samples of the plurality of data samples on the plot, wherein the third line representation is different from the first line representation and the second line representation.

13. The computing device of claim 8, wherein the first line representation and the second line representation comprises a plurality of shades of grey.

14. The computing device of claim 8, wherein the first line representation and the second line representation comprises colors.

15. The computing device of claim 8, wherein the first line representation and the second line representation comprises a plurality of patterns.

16. A system, comprising:
   at least one sensor;
   a machine;
   a computing device comprising a processor, a display device coupled to said processor, and a memory coupled to the processor, wherein the memory contains processor-executable instructions for performing the steps of:
      storing, in the memory, a data set based on measurement information from the at least one sensor;
      separating the data set into a plurality of data samples based on a period of time;

grouping the plurality of data samples into a first set of data samples and a second set of data samples based on a density of values of the plurality of data samples;

displaying, with the display device, a first line representation of the first set of data samples, the first line representation is determined based on a range of darkness and the density of values; and displaying, with the display device, a second line representation of the second set of data samples, wherein the first set of data samples comprise a greater density than the second set of data samples, wherein a first darkness level of the range of darkness associated with the first line representation and a second darkness level of the range of darkness associated with the second line representation vary directly with respect to a first number of data samples in the first set of data samples and a second number of data samples in the second set of data, and wherein the first line representation comprises a darker visualization in the range of darkness as compared to the second line representation.

17. The system of claim 16, wherein the first line representation and the second line representation comprises a plurality of shades of grey, colors, patterns, blinking frequency, and shakiness.

18. The system of claim 16, wherein the machine is configured to convert a raw resource into electricity, and wherein the at least one sensor is configured to measure a vibration of the machine.

* * * * *